T. J. FLAHERTY.
AUTOMATIC CLUTCH RELEASE.
APPLICATION FILED SEPT. 27, 1919.
1,378,777.
Patented May 17, 1921.
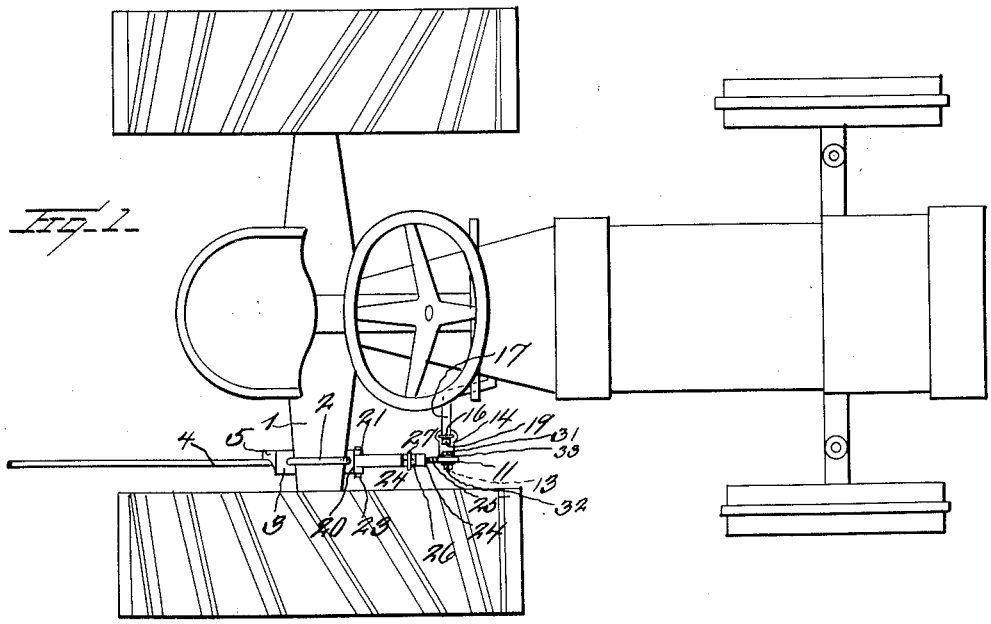
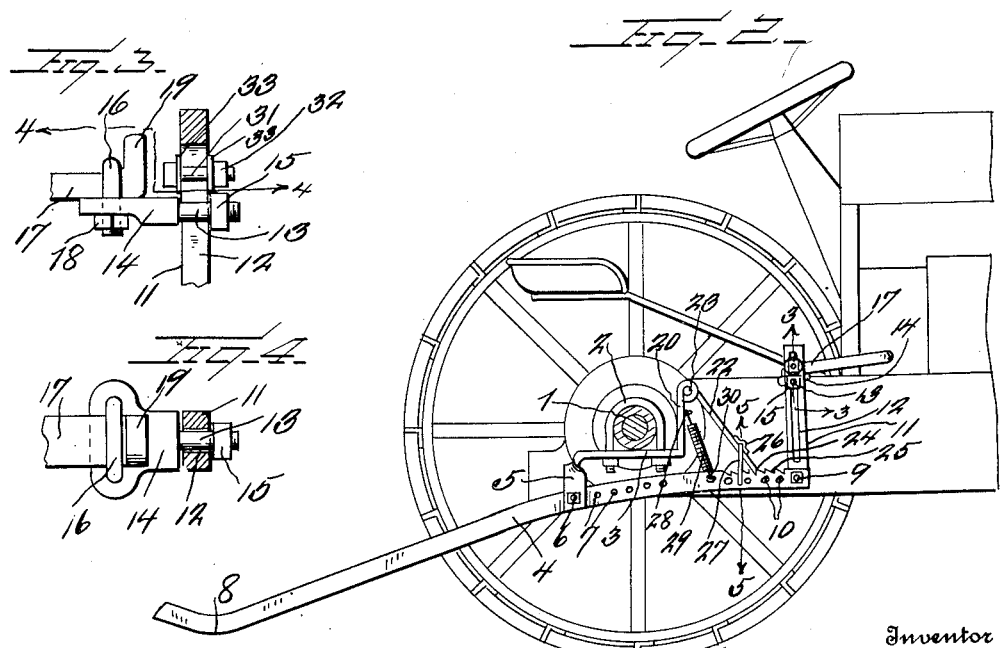
Inventor
T. J. Flaherty
By Watson E. Coleman
Attorney

UNITED STATES PATENT OFFICE.

TIMOTHY J. FLAHERTY, OF LA SALLE, ILLINOIS.

AUTOMATIC CLUTCH-RELEASE.

1,378,777.   Specification of Letters Patent.   Patented May 17, 1921.

Application filed September 27, 1919. Serial No. 327,009.

*To all whom it may concern:*

Be it known that I, TIMOTHY J. FLAHERTY, a citizen of the United States, residing at La Salle, in the county of La Salle and State of Illinois, have invented certain new and useful Improvements in Automatic Clutch-Releases, of which the following is a specification, reference being had to the accompanying drawings.

This invention relates to an automatic clutch release for tractors, and an object of the invention is to provide a device of this kind which is very simple, efficient and practical in construction and may be manufactured for a relatively low cost and sold at a reasonable profit.

It has been found that in tractors, particularly in the Fordson type, their front ends rise up and very often fall backward, either injuring or killing the driver or operator of the tractor, therefore another object of the invention is to provide an automatic clutch release, for releasing the clutch, and allowing the clutch (not shown) to operate, to hold the front end of the tractor down in engagement with the ground, thereby avoiding accidents of the above type.

A further object of the invention is the provision of means for locking or holding the clutch releasing bar in different adjusted positions, so that the rear ground engaging end of the bar may be held at different heights from the ground, to prevent the ground engaging end from dragging on the ground when its contact with the ground is unnecessary to release the clutch lever.

A still further object of the invention is the provision of a slide connection between the forward end of the clutch releasing bar and the clutch foot pedal, to permit the clutch foot pedal to operate freely when it is unnecessary to utilize the clutch releasing bar to release the clutch.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:

Figure 1 is a plan view of a general form of construction of tractor, showing the clutch pedal, and illustrating the improved clutch release device as applied.

Fig. 2 is a side view of the tractor, showing the general outlines thereof, and also showing the automatic release applied.

Fig. 3 is a sectional view on line 3—3 of Fig. 2.

Fig. 4 is a sectional view on line 4—4 of Fig. 3.

Fig. 5 is a sectional view on line 5—5 of Fig. 2.

Referring more especially to the drawings, 1 designates the rear axle of a tractor, preferably of the Fordson type, though not necessarily, and secured to the rear axle casing by means of a band 2 is a strap iron plate 3. This strap iron plate 3 has at its rear end a downwardly extending arm 5 to which an elongated clutch releasing bar 4 is adjustable and pivotally mounted by means of a bolt and its nut 6 and the aperture 7, whereby the bar may have pivotal action. For example, the bolt may be detached and inserted in any one of the other apertures 7 to hold the bar in different adjusted positions. The greater portion of the bar extends rearwardly and is designed to engage the ground. In fact, the rear part of the bar is provided with a curved portion 8, so as to easily ride over the ground and not be obstructed. The extremity of the bar beyond the curve 8 is turned slightly upward.

Connected to the forward end of the clutch releasing bar 4 pivotally and adjustably by means of the bolt and its nut 9 and the apertures 10 is a link bar 11. This link bar may be adjusted relatively to the bar 4 by detaching the nut from the bolt 9, and inserting the bolt in any one of the other apertures 10, so that the link bar 11 may be adjusted relatively to the bar 4.

The link bar 11 is provided with an elongated slot 12 through which a cylindrical extension 13 of the plate 14 extends, there being a nut 15 threaded upon the extension 13, to hold the extension slidably in engagement with the slot. A connecting or coupling staple 16 arches the lateral portion 17 of the foot clutch pedal and has its legs passing through the plate 14, there being nuts 18 threaded to the legs to hold the coupling or connecting staple in place. It will be noted that the upward extension 19 of the lateral part 17 of the clutch foot pedal coöperates with the connecting or coupling staple 16 to prevent disengagement of the staple from the lateral part of the clutch foot pedal. An abutment is mounted in the slot 12 of the link bar and against which a portion of the connection with the link bar, say for instance the nut 15 contacts, to limit the clutch foot pedal in its play relatively to the link bar.

The strap iron plate 3 has at its forward end an upwardly extending arm 20, to the upper end (which is bifurcated at 21) of which a locking plate 22 is pivotally mounted by means of the pin 23. This locking plate extends downwardly and forwardly and has a V-shaped end edge 24 to engage any one of the ratchet teeth 25 of the forward end of the short arm of the clutch releasing bar 4. This locking plate 22 operates by gravity to engage any one of the ratchet teeth, to hold the clutch releasing bar 4 in different adjusted positions, in other words to hold the rear curved portion of the bar slightly raised from the ground, so as to pass over the ground without being obstructed and yet be in a position to actuate the clutch foot pedal, to prevent the forward end of the tractor from rising upwardly. Pivotally mounted on the locking plate 22 by means of a cap plate 26 is a retaining member 27. This retaining member is U-shaped and it straddles the forward arm of the clutch releasing bar 4 to hold the locking plate at all times in alinement with the bar, so as to prevent disengagement of the V-shaped end of the locking plate with the teeth 25. This retaining member 27 hangs downwardly and is maintained in the position illustrated in Fig. 2 by means of gravitation. Connected at 28 to the upstanding arm 20 of the strap iron plate 3 is a coil spring 29, which has its other end 30 connected in any one of the apertures or openings 10. It will be noted that when the clutch releasing bar 4 is adjusted, it is necessary to adjust the connection of the spring 29 relatively to the bar 4, that is to say, into any one of the apertures 10. By means of the spring 29, the forward arm of the clutch releasing bar 4 is always maintained in an upward position with its ratchet teeth in engagement with the locking plate 22. It will be noted that the locking plate 22 may be adjusted in the ratchet teeth rearwardly, and when such is the case the rear curved end of the bar 4 may be held in a considerably raised position and very close position relatively to the ground, so as to hold the foot pedal down and the clutch out of gear, until the driver can get time to get his foot on the clutch pedal.

It will be noted that when the forward end of the tractor tends to rise upwardly, owing to a sudden stop, the rear end of the bar 4 will contact with the ground. The contact of the bar with the ground will cause a pivotal action of the bar upon its bolt 6, and through the medium of the short arm of said bar, a pulling action will be imparted on the link bar 11, which will actuate the foot clutch pedal, thereby releasing it, and permitting it to so operate in connection with the clutch (not shown), thereby preventing the tractor from rising upwardly and falling backwardly. The abutment for the connecting or coupling plate 14 comprises a bolt 31 (which passes through the slot 12) and its nut 32 including the washers 33. It will be noted that the nut 32 may be loosened, and the bolt adjusted, so that the abutment can be arranged in different adjusted positions relatively to the coupling or connecting plate.

When the forward end of the tractor rises, the rear curved end 8 of the bar 4 will lower and contact with the ground or soil. This will cause the forward end of the bar 4 to move upwardly at the same time causing the front end of the bar 4 to operate the foot pedal to release the clutch. When the forward end of the bar 4 lowers, and owing to the pulling action upon the link bar 11, the clutch will be released. The locking plate 22 will swing rearwardly by gravitation and since the bar is under tension of the spring 29, the beveled end of the locking plate will slip over the ratchet teeth 25 of the bar 4 and finally engage with one of the teeth, thereby holding the rear end 8 of the bar up. The locking plate 22 will assume more of an upright position when the bar 4 performs such a function, and furthermore by means of the bar the foot clutch pedal will be held in such a position as to hold the clutch released until the driver can get time to place his foot on the foot clutch pedal. The motor will continue to operate but the clutch cannot drop back into operative position after the front end of the tractor lowers. Should the clutch be automatically released, and not automatically locked out of engagement when the front end of the tractor lowers, the clutch would be thrown into gear and the forward end of the tractor would repeatedly rise, that is to say, should the tractor be brought to a sudden stop when traveling at a fair rate of speed.

The invention having been set forth, what is claimed as new and useful is:

1. The combination with a tractor provided with a foot clutch pedal, of a foot clutch pedal releasing bar pivotally mounted on the rear axle casing of the tractor and comprising long and short arms, the former being adapted to engage the ground, a sliding link connection between the latter and the foot clutch pedal, whereby as the forward end of the tractor tends to tilt upwardly the long arm of the bar will contact with the ground to release the foot clutch pedal, means coöperating with the forward end of the short arm for automatically locking the releasing bar with its rear ground engaging end in different adjusted positions relatively to the ground.

2. The combination with a tractor provided with a foot clutch pedal, of a foot clutch pedal releasing bar pivotally mounted on the rear axle casing of the tractor and comprising long and short arms, the former being adapted to engage the ground, a sliding link connection between the latter and the foot clutch pedal, whereby as the forward end of the tractor tends to tilt upwardly the long arm of the bar will contact with the ground to release the foot clutch pedal, means coöperating with the forward end of the short arm for automatically locking the releasing bar with its rear ground engaging end in different adjusted positions relatively to the ground, means for retaining the locking means in engagement with the short arm, and preventing excessive lateral movement, and spring means to insure holding the locking means in engagement with the foot clutch pedal releasing bar.

3. In combination with a foot clutch pedal of a tractor, a hanger on the rear axle casing, an element pivotally suspended on the hanger and comprising a long arm adapted to engage the ground at the rear of the tractor when the tractor tilts rearwardly, and a short arm extending forward, a link connecting the forward short arm and the clutch pedal, means carried by the hanger and adjustably engaging the forward short arm to hold the clutch pedal in the upper part of the opening of the link, and tensioning means connecting the hanger and the short arm to hold the first means adjustable in engagement with the short arm.

4. In combination with a foot clutch pedal of a tractor, a hanger on the rear axle casing, an element pivotally suspended on the hanger and comprising a long arm adapted to engage the ground at the rear of the tractor when the tractor tilts rearwardly, and a short arm extending forward, a link connecting the forward short arm and the clutch pedal, means carried by the hanger and adjustably engaging the forward short arm to hold the clutch pedal in the upper part of the opening of the link, and tensioning means connecting the hanger and the short arm to hold the first means adjustable in engagement with the short arm, and means carried by the first means and straddling the short arm to prevent lateral movement of the first means relatively to the short arm.

In testimony whereof I hereunto affix my signature.

TIMOTHY J. FLAHERTY.